United States Patent
Herbek et al.

(10) Patent No.: US 8,132,525 B2
(45) Date of Patent: Mar. 13, 2012

(54) OCEAN THERMAL BUOYANCY AND PROPULSION SYSTEM

(75) Inventors: Matthew Herbek, Gainesville, VA (US); Robert Dietzen, Bealeton, VA (US); Braden Powell, Lindon, UT (US); Sean Day, Oak Hill, VA (US); Kenneth Blanchette, North Smithfield, RI (US); Matthew Gries, Houston, TX (US); Matthew B. Ascari, Manassas, VA (US); John W. Rapp, Manassas, VA (US); Robert J. Howard, Clifton, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 348 days.

(21) Appl. No.: 12/544,375

(22) Filed: Aug. 20, 2009

(65) Prior Publication Data
US 2012/0015567 A1    Jan. 19, 2012

Related U.S. Application Data

(63) Continuation-in-part of application No. 12/017,966, filed on Jan. 22, 2008.

(51) Int. Cl.
*B63G 8/14*       (2006.01)
(52) U.S. Cl. ......... 114/333; 114/312; 114/330; 114/331
(58) Field of Classification Search ........... 114/312–342
See application file for complete search history.

(56) References Cited

U.S. PATENT DOCUMENTS
5,291,847 A * 3/1994 Webb .......................... 114/331

OTHER PUBLICATIONS

"Motorless Sub Keeps Going", *Washington Post*, (Feb. 11, 2008), 1 page.
Davis, R., et al., "Autonomous Buoyancy-driven Underwater Gliders", http://www-pord.ucsd.edu/~rdavis/publications/4Gliders.pdf, (2002), 23 pages.

* cited by examiner

*Primary Examiner* — Edwin Swinehart
(74) *Attorney, Agent, or Firm* — Schwegman, Lundberg & Woessner, P.A.

(57) ABSTRACT

A water navigable vessel or glider can transport cargo across oceans and other bodies of water without the use of fossil or nuclear fuels. The vessel includes a housing, a cargo or payload area within the housing, one or more control fins attached to the housing, a ballast within the housing, an expandable and contractible container configured to receive a clathrate and maintain a minimum amount of pressure on the clathrate within the housing in proximity to the ballast, and an intake valve coupled to the ballast. The clathrate changes state, thereby changing the buoyancy of the glider, and causing the glider to move through the body of water.

23 Claims, 7 Drawing Sheets

OCEAN THERMAL BUOYANCY AND PROPULSION SYSTEM

RELATED APPLICATIONS

This is a continuation in part of U.S. Serial application Ser. No. 12/017,966 filed on Jan. 22, 2008, the contents of which are incorporated herein by reference in its entirety.

TECHNICAL FIELD

Various embodiments relate to unmanned underwater vehicles, and in an embodiment, but not by way of limitation, to the buoyancy and propulsion of unmanned underwater vehicles.

BACKGROUND

Unmanned Underwater Vehicles (UUV) are effective in both commercial and military operations. A shortcoming of UUVs however is that due to cost and size, it is difficult to provide enough fuel and/or battery storage to power and propel the UUV and its payload for extended periods of time. The art would therefore benefit from an improved power and propulsion system for UUVs.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

One or more figures show block diagrams of systems and apparatus of embodiments of the invention. One or more figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In an embodiment, the thermocline of an ocean, sea, or other large body of water is used as an energy source to provide motion and to power the payload of an unmanned underwater vehicle (UUV). While such vehicles could also be manned, this disclosure will focus on unmanned vehicles. Specifically, clathrates (for example, methane hydrate, hydrates of R-114, and propane hydrate) are used to alter the buoyancy of the UUV by exchanging heat with the ocean environment. Propane hydrate may be preferred since it is a liquid at a lower pressure than other agents and it has a favorable freezing point. Additionally, the clathrate permits energy to be recovered from the ocean water to power the payload.

In general, a clathrate (or clathrate compound or cage compound) is a chemical substance consisting of a lattice of one type of molecule trapping and containing a second type of molecule. For example, a clathrate hydrate is a special type of gas hydrate that consists of water molecules enclosing a trapped gas. A clathrate is therefore a material which is a weak composite, with molecules of suitable size captured in spaces which are left by other compounds. Methane clathrate (methane hydrate or methane ice) is a solid form of water that contains a large amount of methane within its crystal structure.

UUV embodiments function most efficiently in tropical oceans, seas, and other large bodies of water. The UUV makes use of the different temperatures between the depths of the seawater. For example, in tropical waters, the temperature of the seawater at the surface can be around 28° C., yet be as low as 4° C. at a depth of 1000 meters. In an embodiment, a ballast tank on the UUV has an expandable bladder that is used to manipulate the buoyancy of the UUV. The bladder is filled with a clathrate, which freezes and expands at 6° C., and which liquefies and contracts when it is heated. A cycle of bladder expansion followed by bladder contraction is directly coupled to the diving and surfacing of the UUV through the ocean thermo-cline, thereby providing the energy.

In an example embodiment, a mechanism is included to prevent the clathrating agent from becoming a gas when it is heated in the surface water. If the clathrating agent became a gas, that would make it difficult for the UUV to re-submerge. One mechanism could be some sort of stop for the membrane, such as a wall or barrier made of a memory metal or other suitable temperature responsive material.

Figure 7:
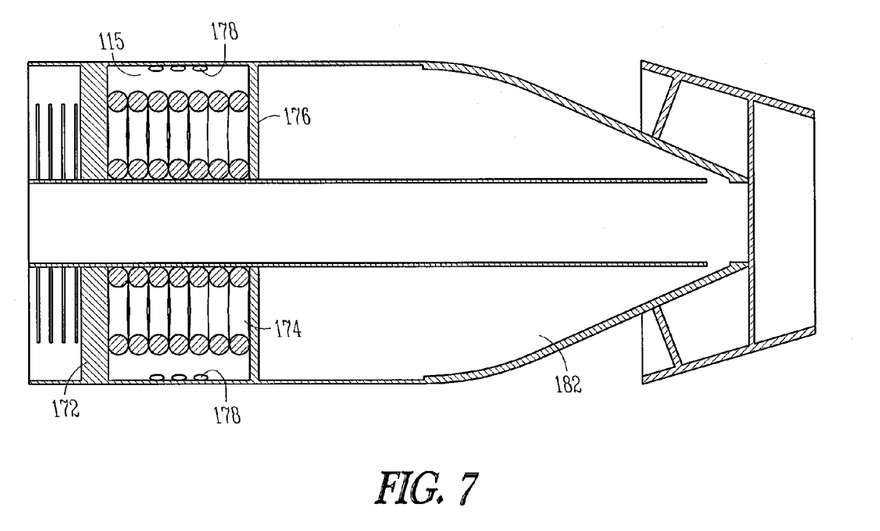
FIG. 7 illustrates another example embodiment of a buoyancy and propulsion system including a spring piston for an unmanned underwater vehicle.

Alternatively, a piston system could be used instead of a bladder system, since such a piston system would have strict expansion limits defined by the volume of the piston's cylinder. A spring or thither mechanism to maintain the pressure may be desirable. An example embodiment of such a piston system is illustrated in FIG. 7. FIG. 7 illustrates the piston system that includes a fixed plate 172, a spring 174, a movable plate 176, and orifices 178 within the seawater ballast 115. The orifices 178 are open to the seawater and/or the seawater ballast. The spring 174 maintains a pressure, for example about 150 psi, on the clathrate chamber 182. As the clathrate freezes and expands, the freezing clathrate causes the plate 176 to move, thereby expelling seawater from the ballast through orifices 178, and increasing the buoyancy of the vessel. Whether the system is bladder-based or piston-based, the system should be designed so that a limited expansion in the system displaces seawater in the ballast.

Additionally, the design of the system should not permit the clathrating agent to evaporate and form a gas. For any given clathrating agent, there will be a critical pressure that must be maintained for a given temperature. If a gas is allowed to form, it will increase the buoyancy of the UUV and prevent the UUV from re-submerging. If gas does form, it should either be vented or re-compressed to a liquid. If recompression is used, propane hydrate may be favorable since it liquefies at lower pressures than other clathrating agents. Furthermore, in a final propulsion stage, it may be advantageous to cause the UUV to become permanently buoyant by disabling the expansion constraints, thereby making the UUV viable in shallow coastal areas.

Figure 1:
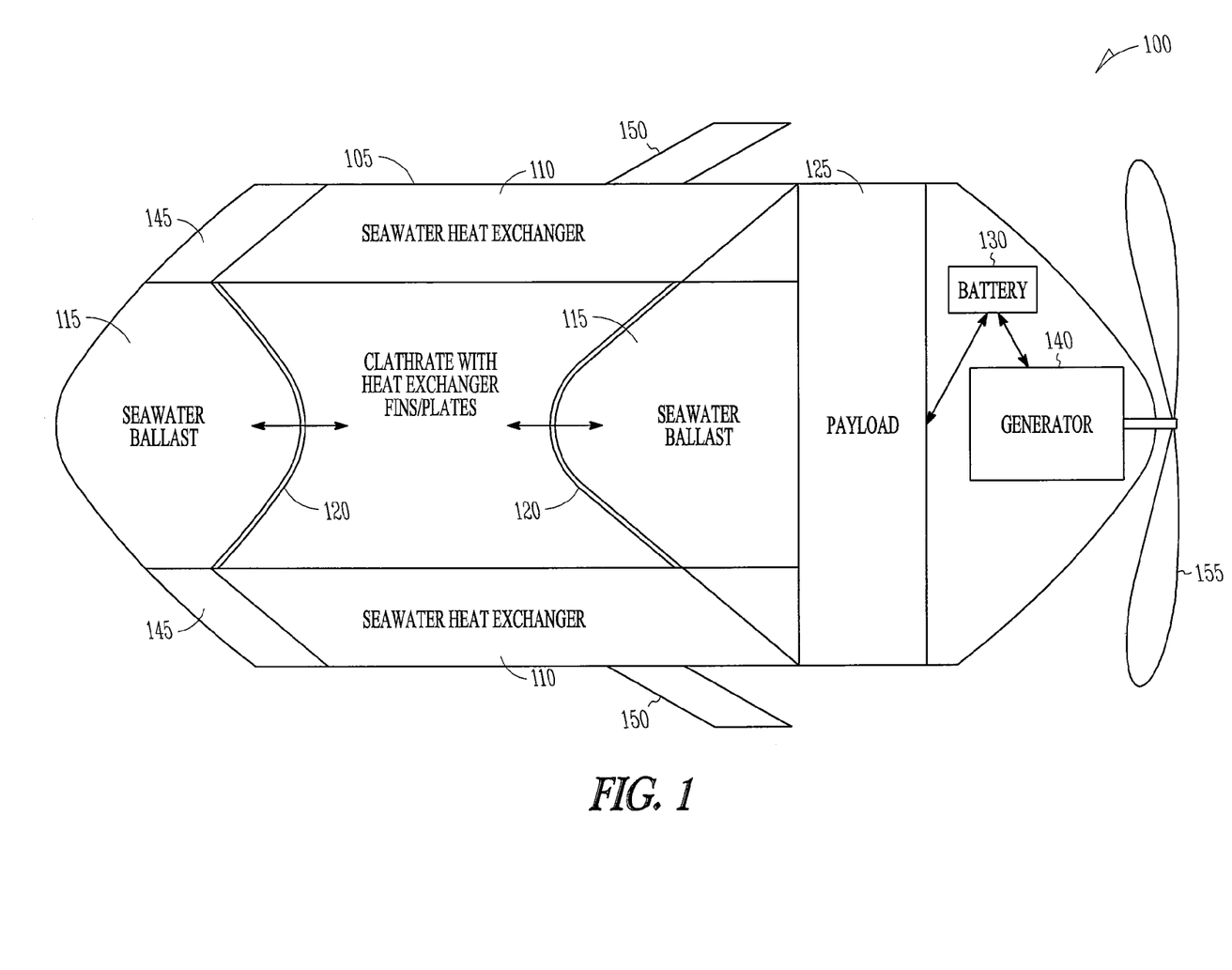
FIG. 1 illustrates an example embodiment of a buoyancy and propulsion system for an unmanned underwater vehicle.

Referring to FIG. 1, an unmanned underwater vehicle (UUV) 100 includes a housing 105. Within the housing 105 is a heat exchanger 110, a ballast 115, a bladder 120, a payload 125, a battery 130, a generator 140, sea water intake valves or ducts 145, control fins 150, and a turbine 155. As previously noted, a piston system could be used in lieu of a bladder.

An example use of the UUV 100 is as follows. In a hot intake state, for example when the UUV 100 is first placed in the seawater, the seawater intake valves 145 are opened, and seawater enters the ballast 115, thereby decreasing the buoyancy of the UUV 100. A clathrate within the confines of the bladder 120, if in a frozen/solid state, is melted by the relatively warm surface seawater, further decreasing the buoyancy of the UUV 100. At this point, the battery 130 is fully charged, the generator 140 decreases output, the velocity is high but decreasing.

In a start dive state, the seawater intake valves 145 begin to close. At this point, the ballast 115 is substantially full of seawater, and the control fins 150 actuate to commence the dive. The velocity of the UUV 100 is low. At the start of the dive, the clathrate is substantially melted, further aiding in the dive of the UUV 100. The battery 130 begins discharging, and the generator 140 is at a minimal output.

In a descent state, the seawater intake valves 145 are still closed, the clathrate remains melted, the ballast tanks 115 are full, the velocity of the UUV 100 is increasing, and the generator 140 increases output.

In an end dive state, the seawater intake valves 145 are opened, the ballast 115 remains full, the clathrate begins cooling, the battery 130 begins recharging, the generator 140 approaches maximum output, and the velocity of the UUV 100 approaches a maximum.

In a cold intake state, the seawater valves 145 are opened, and the cooling and fusing clathrate pushes the seawater out of the ballast 115. The freezing of the clathrate also begins to increase the buoyancy of the UUV 100. The battery 130 is fully charged, the generator 140 decreases output, and the velocity of the UUV 100, while still high, is decreasing.

In a start climb state, the seawater intake valves 145 actuate to close. The ballast 115 becomes empty, and the clathrate becomes substantially fused. The control fins 150 actuate to climb. The battery 130 is discharging and the output of the generator 140 is at a minimum. The velocity of the UUV 100 is low.

In an ascent state, the seawater intake valves 145 remain closed, the clathrate is fused, the ballast 115 is empty, and the generator 140 increases output. The velocity of the UUV 100 is increasing.

In an end climb state, the seawater intake valves 145 are opened, the clathrate begins liquefying, the ballast 115 begins to fill, the battery 130 begins recharging, the output of the generator 140 approaches a maximum, and the velocity of the UUV 100 approaches a maximum.

Figure 2:
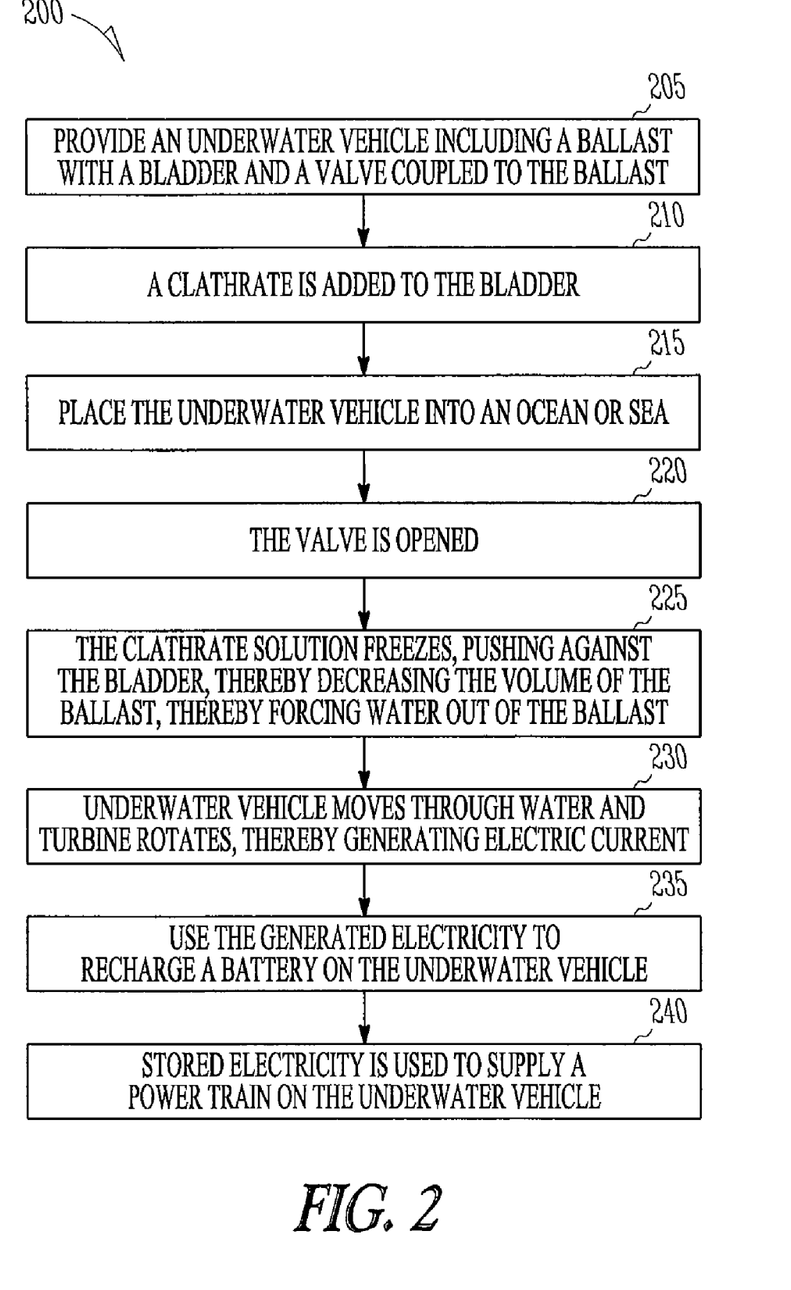
FIG. 2 is a flowchart of an example process to propel and alter the buoyancy of an unmanned underwater vehicle.

FIG. 2 is a flowchart of an example process 200 for altering the buoyancy of and generating and supplying power to a UUV 100. FIG. 2 includes a number of process blocks 205-240. Though arranged serially in the example of FIG. 2, other examples may reorder the blocks, omit one or more blocks, and/or execute two or more blocks in parallel.

In process 200, at 205, an underwater vehicle including a ballast with a bladder and a valve coupled to the ballast is provided. At 210, a clathrate is added to the bladder. At 215, the underwater vehicle is placed into an ocean, a sea, or other large body of water of substantial depth (greater than approximately 1,000 meters). At 220, the valve is opened. The opening of the valve causes the ballast to fill with seawater, which in turn causes the vehicle to lose buoyancy. As the underwater vehicle dives due to its decreased buoyancy, the clathrate within the bladder begins to cool. At 225, the clathrate solution freezes and expands. The frozen, expanded clathrate is less dense than the liquid clathrate and increases the buoyancy of the underwater vehicle. The frozen clathrate also pushes against the bladder, which decreases the volume of the ballast, which in turn forces water out of the ballast, which also increases the buoyancy of the underwater vehicle. At 230, as the underwater vehicle moves through its environment, the sea water causes the turbine 155 to rotate, which results in the generation of electric current in the generator 140. At 235, the generated electricity is used to recharge a battery on the underwater vehicle, and at 240, the stored electricity is supplied to a power train on the underwater vehicle.

Figure 3:
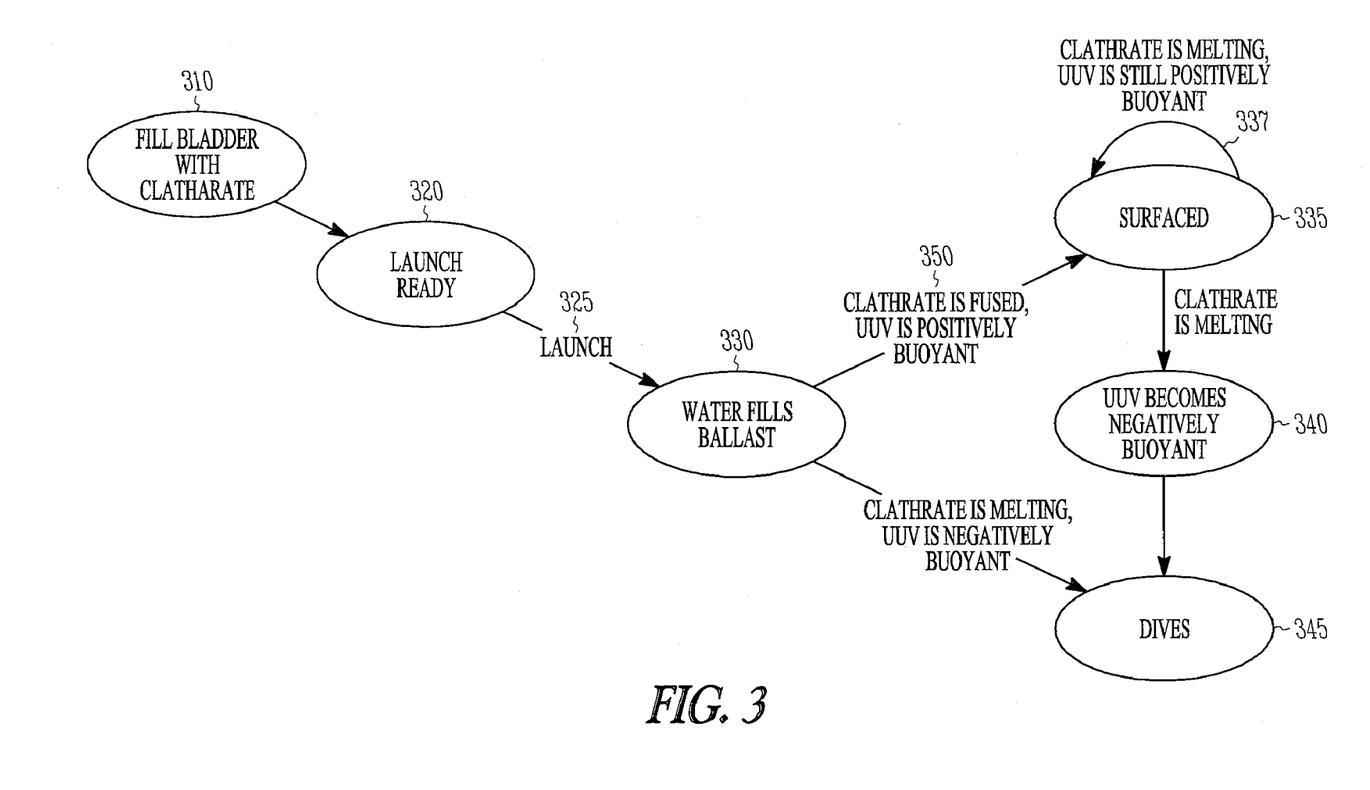
FIG. 3 is a diagram of unmanned underwater vehicles states.

FIG. 3 illustrates another depiction of the UUV states. At 310, the bladder is filled with clathrate. The UUV is readied to launch at 320. After launch at 325, water fills the ballast at 330. At this point, the clathrate is melting, the UUV remains positively buoyant at the surface at 335, and remains at that state as indicated by the arrow 337. At some point, the UUV becomes negatively buoyant at 340, and dives at 345. At some depth, the clathrate becomes fused, and the UUV becomes positively buoyant again at 350.

Figure 4:
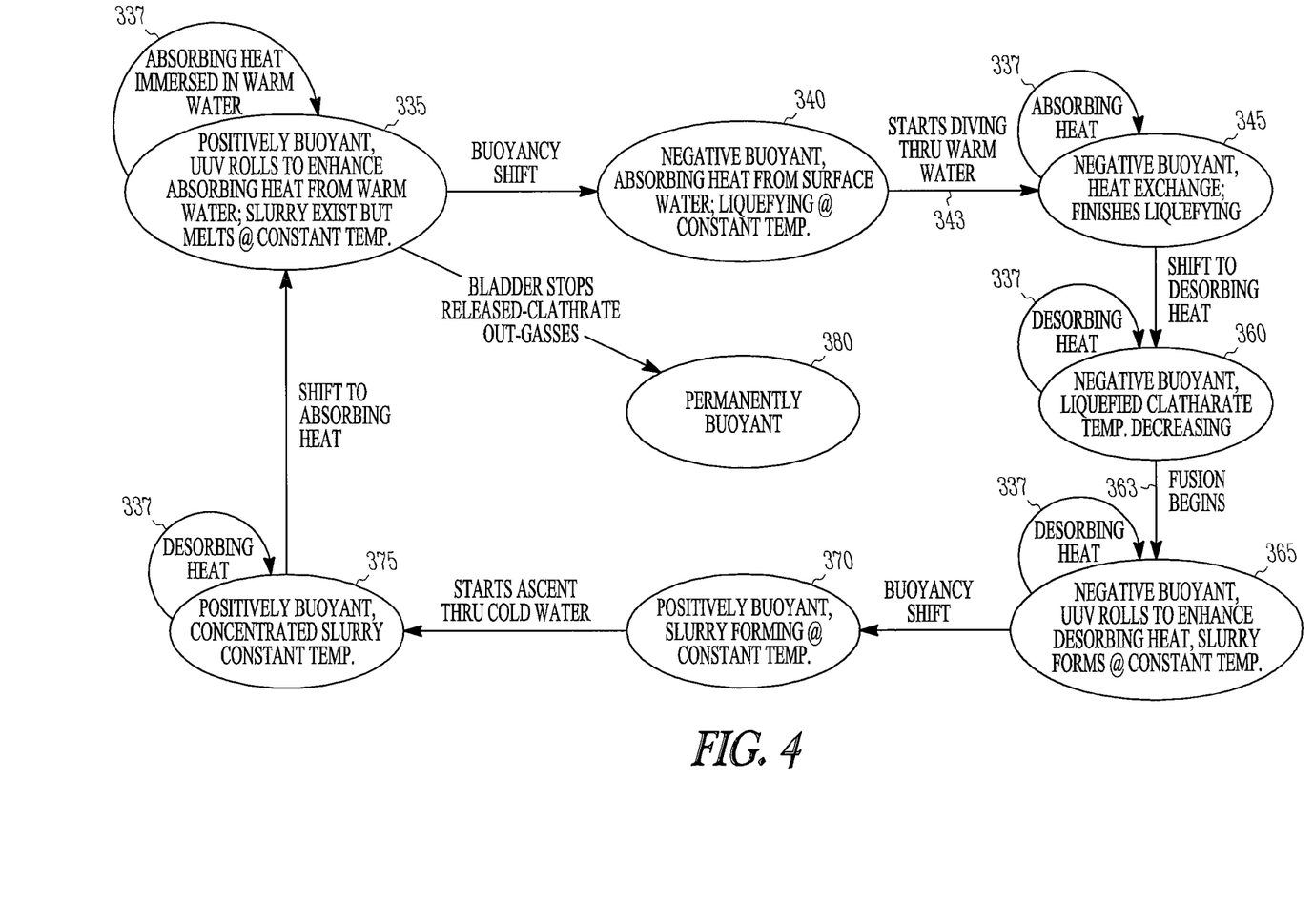
FIG. 4 is a diagram of a thermodynamic cycle of an unmanned underwater vehicle in a body of water.

FIG. 4 illustrates the thermo cycle of the UUV in more detail. The reference numbers 335, 340, and 345 correspond to the same states as indicated in FIG. 3. Also, the arrows 337 indicate a UUV can remain in that state for a period of time. At 335, the UUV is at the surface. It is positively buoyant, and it can roll to enhance absorbing heat from warm water. A clathrate slurry exists, but it begins to melt at the constant temperature of the clathrate fusion. At 340, the UUV becomes negatively buoyant with the clathrate still absorbing heat from the surface water and the clathrate slurry still liquefying. The UUV begins diving through the warm water at 343, remaining negatively buoyant at 345. The clathrate finishes liquefying. Eventually, there is a thermodynamic shift for the liquefied clathrate from absorbing heat to desorbing heat. At 360, the UUV remains negatively buoyant, and the temperature of the liquefied clathrate starts to decrease. Fusion of the clathrate begins at 363, the UUV is negatively buoyant at 365, and a clathrate slurry forms at the constant temperature. At 370, the UUV transitions to being positively buoyant again, and is increasingly positively buoyant at 375. It is noted that 340 and 370 are primarily transition states. Additionally, 380 indicates that the cycle can be broken if the clathrate gases out of solution.

Figure 5:
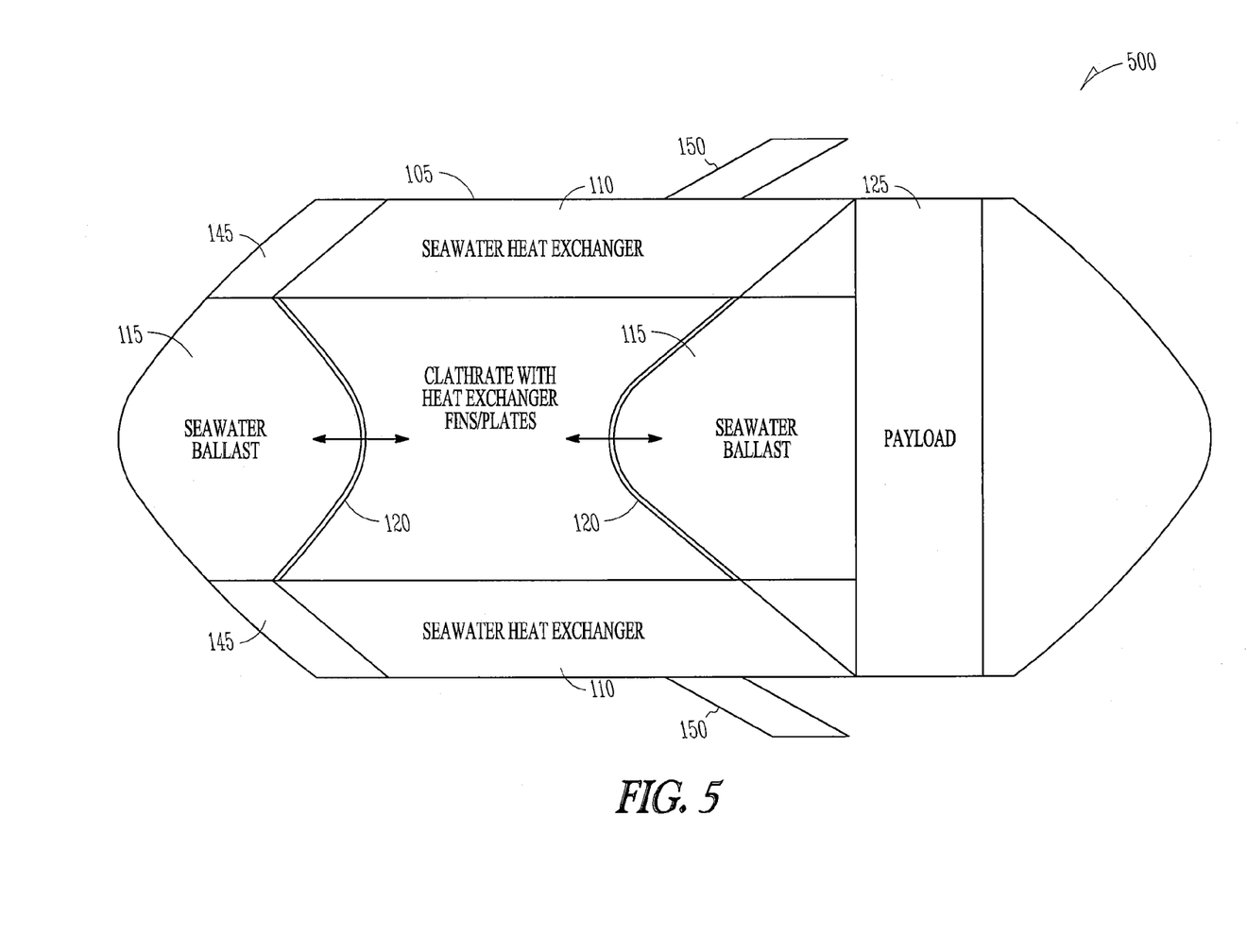
FIG. 5 illustrates another example embodiment of a buoyancy and propulsion system for an unmanned underwater vehicle.

FIG. 5 illustrates an embodiment of an UUV 500 that can be used to transport cargo across oceans and other large bodies of water. As can be seen in FIG. 5, the UUV 500 includes most of the same components as the UUV 100 of FIG. 1, including the housing or body 105, the heat exchanger 110, the ballast 115, the bladder walls 120, the payload 125 (located within a payload or cargo hold area), the intake valve 145, and the control fins 150. The UUV 500 may also include an impeller, generator, and battery as illustrated in the UUV 100 of FIG. 1, but these components are not illustrated in connection with the UUV 500 of FIG. 5. In the UUV 500 of FIG. 5, the payload 125 can also be referred to as cargo. In the embodiment of FIG. 5, the weight of the payload or cargo 125 is used in connection with the thermocline of a large body of water to propel the UUV 500 through the body of water.

In an embodiment such as the UUV 500 of FIG. 5, once the volume of the UUV approaches or exceeds the size of a large torpedo (i.e., approximately 3 meters in length and 0.25 meters in diameter), its weight must be increased enough so that its weight is approximately 1% greater than the weight of the water it is displacing, so that it can become negatively buoyant. Such an UUV can be referred to as a Super Sized UUV or clathrate glider. For a large UUV, such as the size of a nuclear submarine, this condition can be met by carrying several thousand kilograms of weight in the UUV in the form of cargo (or payload), electronics, or even dead weight. The UUV would not be able to function if it did not carry this approximate amount of cargo because it would not be able to become negatively buoyant. This is in stark contrast to modern day cargo ships, which of course depend on positive buoyancy, and in which the addition of cargo weight increases the fuel consumed and the cost of shipping such cargo. However, in the case of the UUV 500, loading the UUV with several thousand kilograms of cargo serves at least two useful purposes. First, as just noted, it permits the UUV to become negatively buoyant. Second, the cargo is transported across large bodies of water without the expenditure of fossil fuels or the use of nuclear technology. Consequently, an embodiment of the UUV 500 has the ability to transport appreciable loads of cargo across great distances of bodies of water without the use of a fossil fueled or nuclear fueled propulsion system.

The weight of cargo or payload required for such a super sized UUV can be calculated as follows:

$$\text{Cargo or Payload Weight} = (0.99)*(D+C)-W$$

wherein D is the mass of the "dry" UUV (that is, the structure alone), C is the mass of the clathrate (initially in liquid form), and W is the mass of the water displaced by the UUV. The 0.99 factor accounts for the needed excess cargo mass that causes the UUV to become negatively buoyant while still permitting the UUV to re-surface in the trajectory as influenced by the positioning of the control fins 150.

The propulsion of the UUV with the cargo therein can be brought about as disclosed above. That is, a liquid clathrate is added to the bladder 120, and the UUV is placed into the water, and towed out of a port. The seawater ballast 115 fills with water via the intake valves 145, and the UUV becomes negatively buoyant. The control fins can be appropriately adjusted so that the angle of descent causes the UUV to traverse the body of water. The most appropriate angle of decent can be determined by one of skill in the art on a case by case basis. Thereafter, as disclosed above, the UUV reaches a depth where the colder water causes the clathrate to freeze and expand, thereby forcing the water out of the seawater ballasts and causing the UUV to become positively buoyant and rise to the surface. Once again, the control fins 150 can be appropriately adjusted so that the angle of ascent causes the UUV to traverse the body of water. In another embodiment, the impeller 155, generator 140, and battery 130 can be used to aid in the propulsion of the UUV. The cycle of descent and ascent may be repeated several times during the traversal of a body of water.

Figure 6:
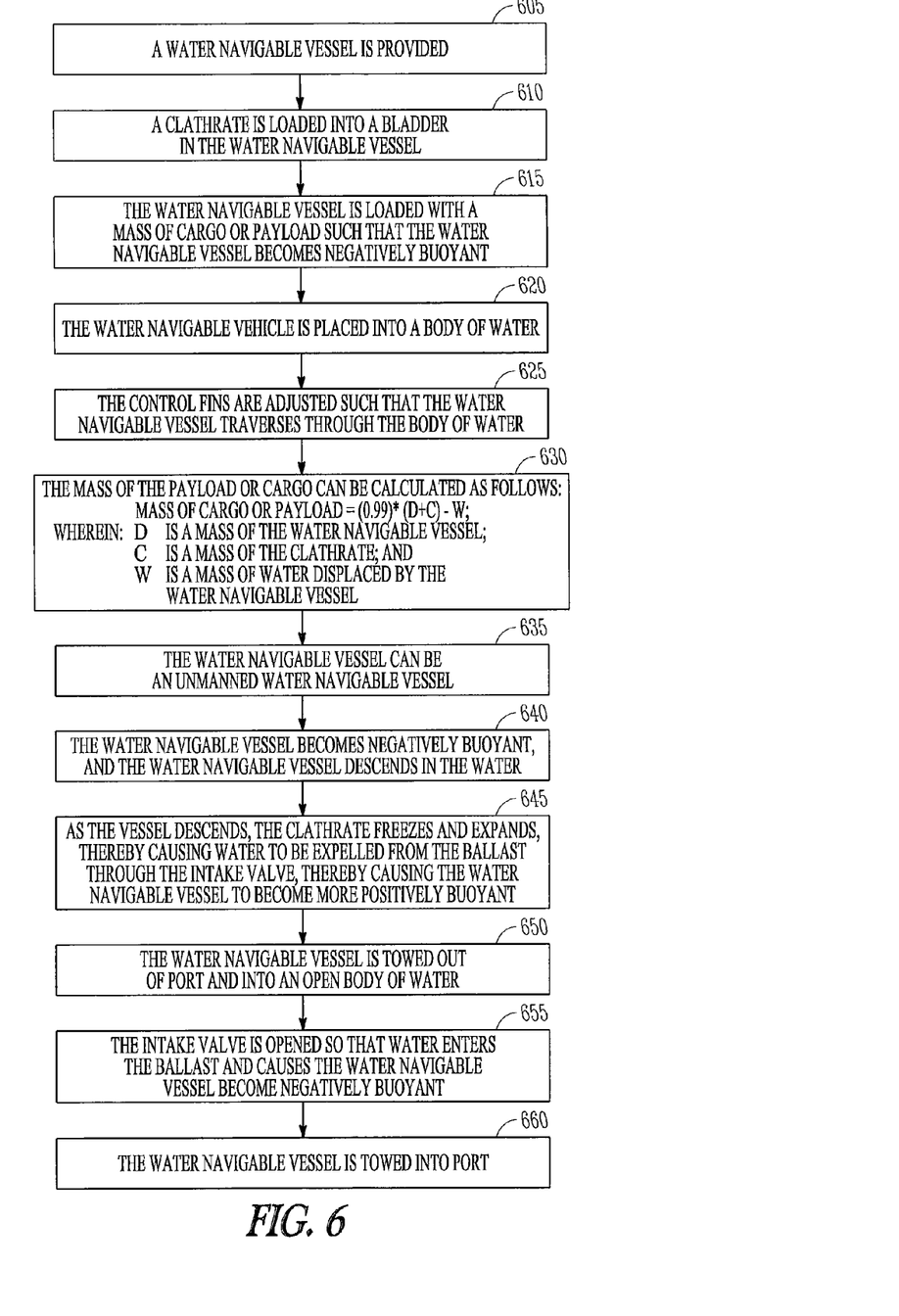
FIG. 6 is a flowchart of a process of transporting cargo in an unmanned underwater vehicle.

FIG. 6 is a flowchart of an example process 600 for transporting cargo across relatively large bodies of water using a UUV. FIG. 6 includes a number of process blocks 605-660. Though arranged serially in the example of FIG. 6, other examples may reorder the blocks, omit one or more blocks, and/or execute two or more blocks in parallel.

Referring now specifically to FIG. 6, at 605, a water navigable vessel (or UUV) is provided. The water navigable vessel includes a housing, a cargo or payload area within the housing, one or more control fins attached to the housing, a ballast within the housing, and a bladder within the housing in proximity to the ballast. In an embodiment, the bladder is formed by one or more bladder walls, and the one or more bladder walls can be made out of a flexible and extendible material. The water navigable vessel further includes an intake valve coupled to the ballast. The bladder is configured to receive a clathrate, and in an embodiment, the water navigable vessel is relatively large scale, such as the size of a conventional submarine and even as large as a nuclear submarine. At 610, a clathrate is loaded into the bladder. At 615, the water navigable vessel is loaded with a mass of cargo or payload such that the water navigable vehicle becomes negatively buoyant. At 620, the water navigable vessel is placed into a body of water.

Continuing with the process 600 of FIG. 6, at 625, the control fins are adjusted such that the water navigable vessel traverses through the body of water. The process block 630 indicates how the mass of the payload or cargo can be calculated. Specifically, the mass of the payload or cargo can be calculated as follows:

$$\text{Mass of Cargo or Payload} = (0.99)*(D+C)-W;$$

wherein

D is a mass of the water navigable vessel;

C is a mass of the clathrate; and

W is a mass of water displaced by the water navigable vessel.

At 635, it is noted that the water navigable vessel can be an unmanned water navigable vessel. At 640, the water navigable vessel becomes negatively buoyant, and the water navigable vessel descends in the water. At 645, as the vessel descends, the clathrate freezes and expands, thereby causing water to be expelled from the ballast through the intake valve, thereby causing the water navigable vessel to become more positively buoyant. At 650, the water navigable vessel is towed out of a port and into an open body of water, and at 655, the intake valve is opened so that water enters the ballast and causes the water navigable vessel to become negatively buoyant. At the end of the journey, after repeated submersions and surfacings, at 660, the water navigable vessel is towed into a port. Alternatively, energy collected en-route via turbine generators may be used to propel the vehicle into port upon arrival. As mentioned previously, a system that permits the clathrate to become a gas may also be used to keep the vehicle on the surface during travel in to and out of ports.

Thus, an example system and method for altering the buoyancy of and generating power for a UUV has been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

What is claimed is:

1. A process comprising:
   providing a water navigable vessel comprising:
      a housing;
      a cargo or payload area within the housing;
      one or more control fins attached to the housing;
      a ballast within the housing;
      a container within the housing in proximity to the ballast, the container comprising one or more expandable and contractible walls, the walls for maintaining a minimum amount of pressure within the container; and
      an intake valve coupled to the ballast;
   loading a clathrate into the container;
   loading the water navigable vessel with cargo or payload such that the water navigable vessel becomes negatively buoyant; and
   placing the water navigable vessel into a body of water.

2. The process of claim 1, comprising adjusting the control fins such that the water navigable vessel traverses through the body of water.

3. The process of claim 1, comprising determining a minimum mass of cargo or payload to ensure a negative buoyancy at a surface of the body of water.

4. The process of claim 3, wherein the minimum mass of the cargo or payload is calculated as follows:

$$\text{Mass of Cargo or Payload} = (0.99)*(D+C)-W;$$

wherein
   D is a mass of the water navigable vessel;
   C is a mass of the clathrate; and
   W is a mass of water displaced by the water navigable vessel.

5. The process of claim 1, wherein the water navigable vessel comprises an unmanned water navigable vessel.

6. The process of claim 1, wherein upon the water navigable vessel becoming negatively buoyant, the water navigable vessel descends in the water and the clathrate freezes and expands, thereby causing water to be expelled from the ballast through the intake valve, thereby causing the water navigable vessel to become more positively buoyant.

7. The process of claim 1, wherein the water navigable vessel comprises:
   an impeller coupled to the housing;
   a generator coupled to the impeller; and
   a battery coupled to the generator.

8. The process of claim 7, comprising storing in the battery energy generated by the generator.

9. The process of claim 8, comprising using the energy stored in the battery to propel the water navigable vessel through the body of water.

10. The process of claim 1, wherein the container comprises a bladder within the housing in proximity to the ballast, the bladder formed by one or more bladder walls, the one or more bladder walls comprising a flexible and extendible material.

11. The process of claim 1, wherein the container comprises a spring piston.

12. The process of claim 1, wherein the container is adjacent to the ballast.

13. The process of claim 1, comprising:
   towing the water navigable vessel out of a port and into an open body of water; and
   opening the intake valve so that water enters the ballast and causes the water navigable vessel to become negatively buoyant.

14. The process of claim 13, comprising towing the water navigable vessel into a port.

15. A water navigable vessel comprising:
   a housing;
   a cargo or payload area within the housing;
   one or more control fins attached to the housing;
   a ballast within the housing;
   a container within the housing in proximity to the ballast, the container comprising one or more expandable and contractible walls, the walls for maintaining a minimum amount of pressure within the container; and
   an intake valve coupled to the ballast;
   wherein the container is configured to receive a clathrate; and
   wherein a mass of cargo or payload within the cargo or payload area cause the water navigable vessel to become negatively buoyant.

16. The water navigable vessel of claim 15, further comprising the clathrate.

17. The water navigable vessel of claim 15, further comprising the payload or cargo.

18. The water navigable vessel of claim 15, comprising:
   an impeller coupled to the housing;
   a generator coupled to the impeller; and
   a battery coupled to the generator.

19. The water navigable vessel of claim 15, wherein the container comprises a bladder within the housing in proximity to the ballast, the bladder formed by one or more bladder walls, the one or more bladder walls comprising a flexible and extendible material.

20. The water navigable vessel of claim 15, wherein the container comprises a spring piston.

21. The water navigable vessel of claim 15, wherein the container is adjacent to the ballast.

22. The water navigable vessel of claim 15, wherein the clathrate comprises a liquid clathrate.

23. The water navigable vessel of claim 15, wherein the water navigable vessel comprises an unmanned water navigable vessel.

* * * * *